United States Patent

Doberstein et al.

Patent Number: 5,809,148
Date of Patent: *Sep. 15, 1998

[54] DECRYPTION OF RETRANSMITTED DATA IN AN ENCRYPTED COMMUNICATION SYSTEM

[75] Inventors: Kevin G. Doberstein, Elmburst; Scott J. Pappas, Streamwood; Michael W. Bright, Arlington Heights, all of Ill.

[73] Assignee: Motorola, Inc., Schaumburg, Ill.

[*] Notice: The term of this patent shall not extend beyond the expiration date of Pat. No. 5,694,473.

[21] Appl. No.: 649,098

[22] Filed: May 17, 1996

[51] Int. Cl.$^6$ ................................ H04L 9/18; H04L 9/00
[52] U.S. Cl. ............................ 380/45; 380/37; 380/42; 380/44; 380/49
[58] Field of Search ................ 380/42, 37, 48, 380/44

[56] References Cited

U.S. PATENT DOCUMENTS

| | | | |
|---|---|---|---|
| 4,654,480 | 3/1987 | Weiss | 380/48 |
| 4,897,876 | 1/1990 | Davies | 380/43 |
| 5,091,942 | 2/1992 | Dent | 380/46 |
| 5,148,485 | 9/1992 | Dent | 380/46 |
| 5,195,136 | 3/1993 | Hardy et al. | 380/43 |
| 5,199,069 | 3/1993 | Barret et al. | 380/28 |
| 5,442,705 | 8/1995 | Miyano | 380/29 |
| 5,598,470 | 1/1997 | Cooper | 380/4 |

*Primary Examiner*—Thomas H. Tarcza
*Assistant Examiner*—Carmen D. White
*Attorney, Agent, or Firm*—Susan L. Lukasik

[57] ABSTRACT

The method generally includes the steps of receiving (201) a message (100) comprising a message indicator (101) and a plurality of encrypted blocks (103 through 111). When at least one block of the plurality of encrypted blocks is received with error, a second message is transmitted (215), which second message requests a retransmission of the at least one block. Upon receiving the retransmission of the at least one block without error, a keystream is generated (219) from the message indicator and the at least one block is decrypted using the keystream.

23 Claims, 5 Drawing Sheets

DECRYPTION OF RETRANSMITTED DATA IN AN ENCRYPTED COMMUNICATION SYSTEM

FIELD OF THE INVENTION

This invention relates to communication systems, including but not limited to encrypted communication systems. Reference is made to U.S. Pat. No. 5,699,473 titled "DECRYPTION OF RETRANSMITTED DATA IN AN ENCRYPTED COMMUNICATION SYSTEM," filed on the same day as the present invention on behalf of Michael W. Bright et al., with the same assignee as the present invention.

BACKGROUND OF THE INVENTION

Encrypted voice and data systems are well known. Many of these systems provide secure communication between two or more users by sharing one or more pieces of information between the users, thereby permitting only those users knowing the information to properly decrypt the message. Generally speaking, a key generator (KG) is used to encrypt or decrypt voice and data messages. A KG is a non-linear mathematical function that generates a pseudo-random sequence given an initial starting vector and a key variable that defines the mathematical function. The KG outputs a keystream that is XORed (exclusive "or" function, as is known in the art) with plain (unencrypted) text to generate cipher text. The cipher text is transmitted to a receiver. The receiver XORs the received cipher text with a keystream, determined by the receiver based on received information, yielding the plain text from the transmitting device.

In addition to having the same encryption key to decrypt an encrypted message, both the encrypting and decrypting encryption devices must be identical, i.e., perform the same encryption algorithm in the same way from the same (internal) encryption state at the same time.

Synchronization (also known as sync) data is sent over the communication channel to enable the decrypting device to line up its encryption state with the encryption state of the encrypting device, after which proper decryption of the incoming message is performed. Encryption synchronization data, when used in encrypted communication systems, is often referred to as a message indicator (MI).

The encryption devices may be operated in one of several modes of operation. The mode of operation that the encryption device uses provides for different methods to synchronize the receiving device to the transmitting device. One mode of operation is known as output feedback (OFB). OFB requires that the same initial starting vector (or MI) be applied to both the transmitting and receiving encryption devices to generate the keystream. At the transmitter, the KG is initialized by an MI. The encryption algorithm is executed to generate the keystream. The keystream is then fed back into the input of the KG to generate the next block of keystream. The same keystream that is fed back is also used to encrypt the data, yielding cipher text. The transmitter transmits the MI and the cipher text to the receiver. At the receiver, the KG is initialized by a message indicator that was transmitted. The encryption algorithm is executed to generate the keystream. The keystream is then fed back into the input of the KG. The same keystream that is fed back is also used to decrypt the data. The data is decrypted by XORing the keystream generated by the encryption algorithm and the data to be decrypted.

A second mode of operation is known as counter addressing (CA) or linear regression. The initial synchronization method used for CA may be the same as for OFB. CA uses a maximal length linear feedback shift register (LFSR) as the input to the encryption device (KG). CA requires that the same initial starting vector (or MI) be applied to the LFSR in both the transmitting and receiving encryption devices to generate the keystream. At the transmitter, the LFSR is initialized by the MI, and executes a generator polynomial. The output of the LFSR is fed into the input of the encryption algorithm. The encryption algorithm is executed to generate the keystream. The keystream is then XORed with the unencrypted plain text to generate the cipher text. The transmitter transmits the MI and the cipher text to the receiver. At the receiver, a linear feedback shift register (LFSR) is initialized by the MI that was transmitted. The output from the LFSR is fed into the input register of the encryption algorithm to generate a keystream. The keystream is then XORed with the cipher text to decrypt the data.

It is desirable in many systems to have a throughput level of data that is consistent for both encrypted data and unencrypted data. When data is received, however, it is not uncommon for the data to be received in error. In many communications systems, it is known to request a retransmission of any data block that is received in error. Such retransmission of data provides a problem in encrypted data systems. Due to the synchronized nature of the encryption process, it is necessary to decrypt N−1 blocks while decrypting a selective retry block N. This property greatly decreases the throughput in an encrypted data system, creating a significant difference in throughput between encrypted and unencrypted data. Typical system implementations include waiting until all blocks are received error-free before decrypting the message. Such a method adds processing delays after the receipt of the last block. Another method is to decrypt the prior N−1 blocks while decrypting a selective retry block N. This method takes (N−1) times the decryption time longer to decrypt a selective retry. In essence, this method requires re-decryption of possibly an entire message that has already been decrypted just to decrypt one block.

Another solution to the retransmission decryption problem is to transmit synchronization information, or MI, for each data block. Such a solution increases the time and energy it takes to both transmit and receive messages. Subsequent retransmission of an MI may also be received in error, requiring further retransmissions.

Accordingly, there is a need for a method of decrypting data after retransmission of some of the blocks is received by the receiving unit without adding unnecessary delays to the decryption process. Additionally, such a method should provide consistent data throughput levels for both encrypted and unencrypted data.

DESCRIPTION OF A PREFERRED EMBODIMENT

The following describes a method of decrypting retransmissions of encrypted data, where the retransmission does not comprise a transmission of an entire message. Upon initial receipt of an encrypted data message comprised of a plurality of blocks, the received blocks are determined to be in error or not in error. A keystream or encryption state is generated and/or stored for either the entire message or for parts of the message, depending on storage space and encryption time. A request for retransmission of blocks received in error is made. When the retransmitted blocks are received without error, the keystream is either pulled from storage or generated from data stored from the initial receipt of the encrypted data message. In this way, it is not necessary to wait until the entire message is received or to redecrypt data in order to decrypt the entire message. Thus, decryption of selected parts of the message is accomplished without unnecessary delays or redundant work.

In one embodiment, the method generally comprises the steps of receiving a message comprising a message indicator and a plurality of encrypted blocks. When at least one block of the plurality of encrypted blocks is received with error, a second message is transmitted, which second message requests a retransmission of the at least one block. Upon receiving the retransmission of the at least one block without error, a keystream is generated from the message indicator and the at least one block is decrypted using the keystream.

In addition, when the message indicator contains an initialization vector, a keystream is generated by executing an encryption algorithm operating in an output-feedback mode of operation N multiplied by B iterations. When the message indicator contains a linear feedback shift register vector, a keystream is generated by executing an encryption algorithm operating in a counter-addressing mode of operation N multiplied by B iterations. N and B are positive integers for an N block message, where B indicates a number of bits of data.

Figure 1:
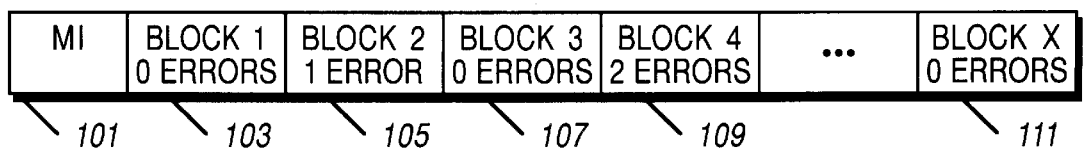
FIG. 1 is a block diagram of a received message in accordance with the invention.

A block diagram of a received message including the number of errors received per block is shown in FIG. 1. A received message 100 typically comprises a message indicator (MI) 101 and a plurality of encrypted blocks 103 through 111. MI 101 is used to synchronize the internal states of encryption devices, known as key generators or KGs. Block 1 103 is received with 0 errors. Block 2 105 is received with 1 error. Block 3 107 is received with no errors. Block 4 109 is received with 2 errors. Block X 111 is received with zero errors, where X is an integer denoting how many encrypted blocks are received in the message 100. In a system in which erroneous blocks are requested to be retransmitted, a retransmission request is transmitted for erroneous blocks, in this case for block 2 105 and block 4 109, assuming that all blocks between block 4 and block X were received without error.

Figure 2:
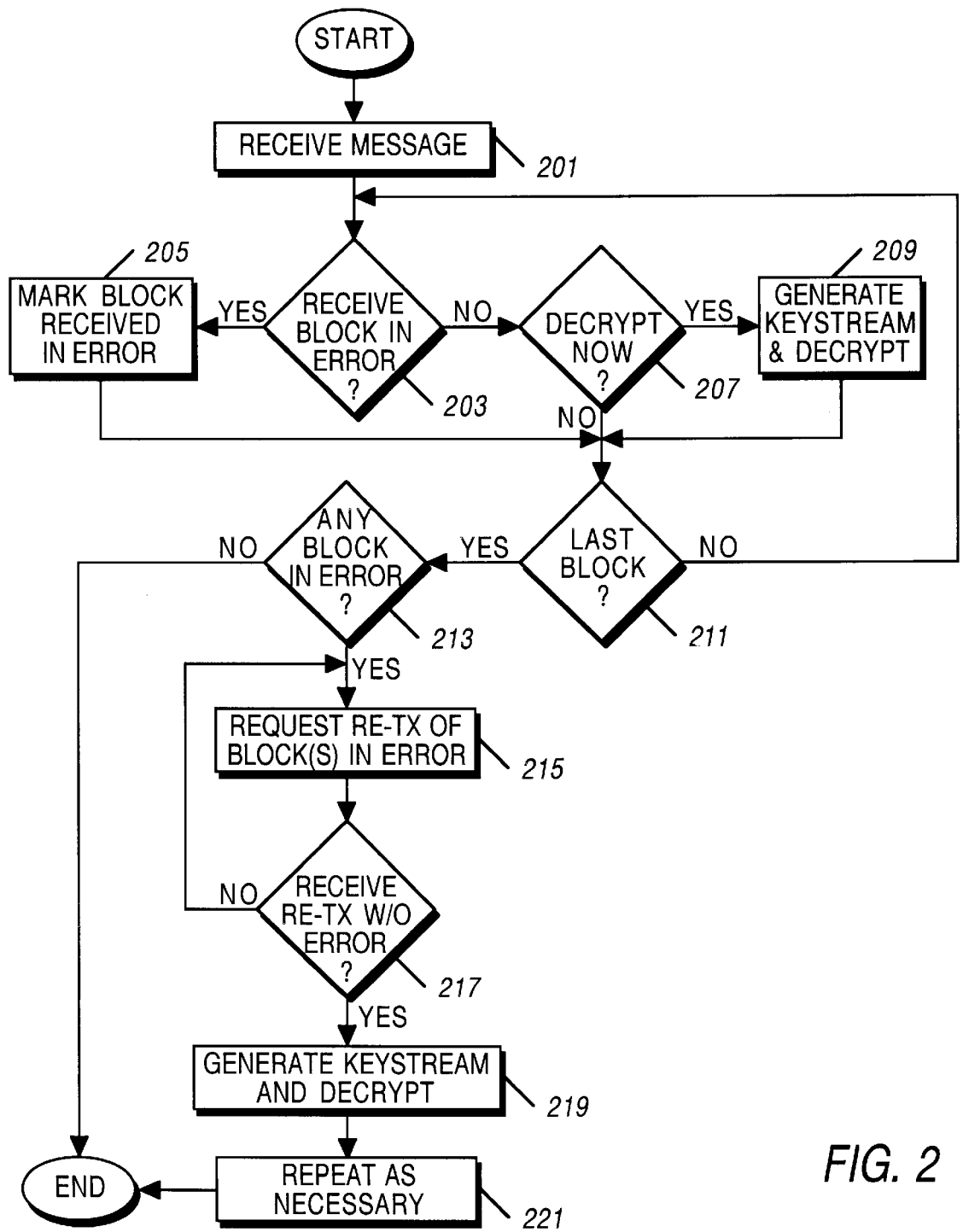
FIG. 2 is a flowchart showing a method of later decrypting messages when one or more blocks of the message are retransmitted in accordance with the invention.

A flowchart showing a method of decrypting messages when one or more blocks of the message are retransmitted to a communication unit is shown in FIG. 2. This method is performed when a message 100 is encrypted using an output feedback or a counter-addressing mode of encryption. At step 201, a message 100 is received, which message comprises a message indicator 101 and a plurality of encrypted blocks 103 through 111. At step 203, each block of the message is reviewed to determine if the block is received in error. Error detection is a function well known in the art and includes use of various techniques, such as cyclic redundancies checks (CRCs), to verify the data as received with or without error. If at step 203 a block is received in error, the block is marked as received in error at step 205 and the process continues with step 211. If at step 203, the block is received without error, the process continues with step 207, where it is determined if blocks received without error are to be decrypted immediately, i.e., before either requesting retransmission of block(s) received in error or receiving error-free retransmission of block(s) received in error. If immediate decryption is to take place at step 207, the process continues with step 209, where a keystream is generated from the MI 101, the blocks received without error are decrypted using the keystream generated from the MI 101, and the process continues with step 211.

At step 211, if the current block is the last block in the message, the process continues with step 213, otherwise the process continues with step 203. At step 215, the communication unit requests retransmission of any block(s) received in error. If retransmission (RE-TX) of such block(s) is received with one or more errors at step 217, the process continues with step 215. If retransmission (RE-TX) of such block(s) is received without error at step 217, the process continues with step 219, where keystream is generated and the blocks are decrypted. At step 221, steps 215, 217, and/or 217 are repeated as necessary. If more retransmissions of blocks need to be decrypted, the process repeats from step 219. If more blocks need to be received, the process repeats from step 217. If immediate decryption did not occur at step 207, all blocks are decrypted at step 219. If immediate decryption occurred at step 207, all blocks not previously decrypted, i.e., those retransmitted to the communication unit, are decrypted at step 219.

An alternative method comprises the steps of receiving a message comprising a message indicator and a plurality of encrypted blocks. A keystream is generated from the message indicator for use in decrypting the plurality of encrypted blocks. When at least one block of the plurality of encrypted blocks is received with error, a second message is transmitted, which second message requests a retransmission of the at least one block. Upon receiving the retransmission of the at least one block without error, the at least one block is decrypted using the keystream.

Figure 3:
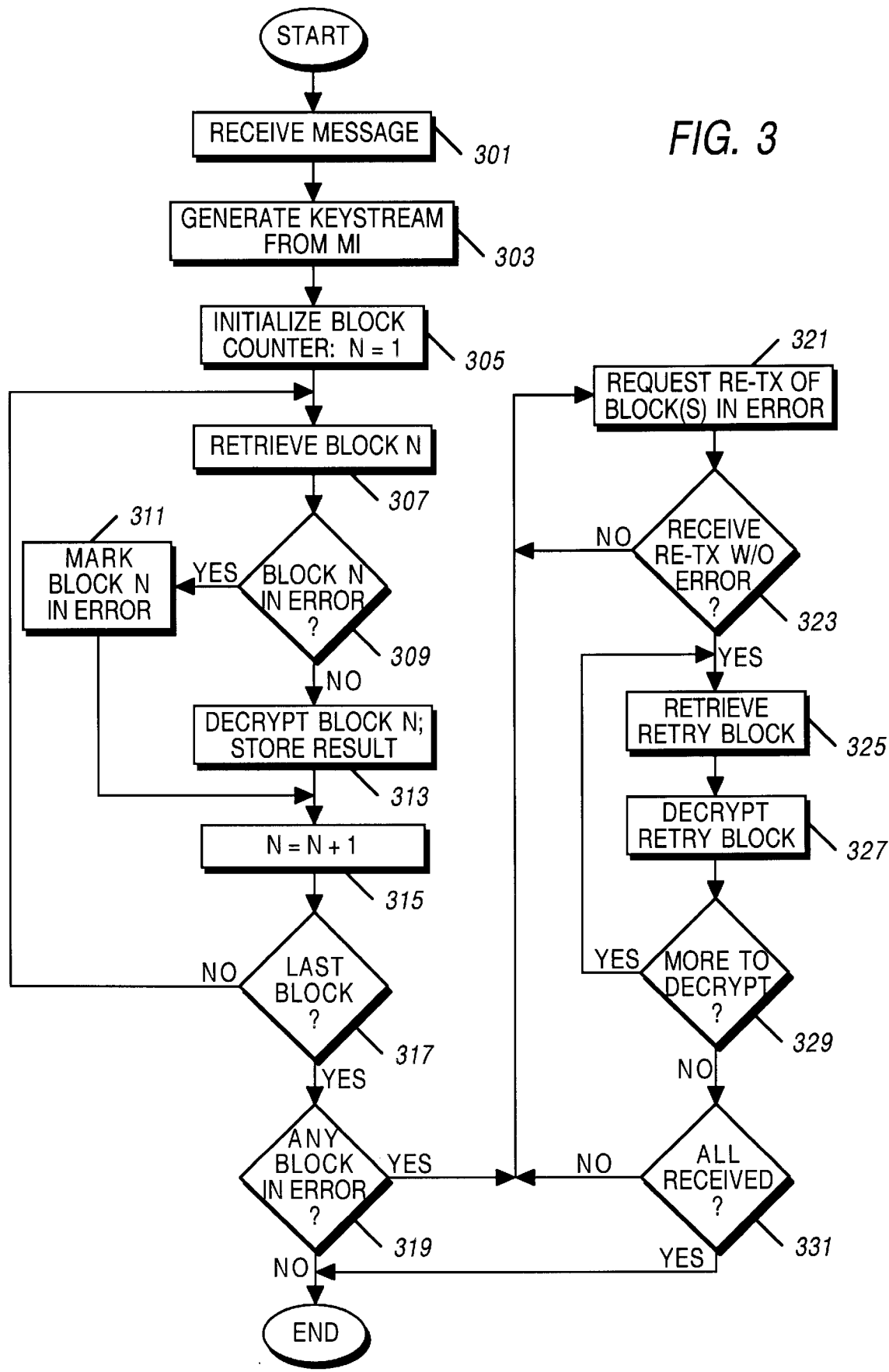
FIG. 3 and FIG. 4 are flowcharts showing a method of later decrypting messages by saving the keystream generated from the original transmission of a message in accordance with the invention.

A flowchart showing an alternative method of later decrypting messages by saving a keystream generated from the original transmission of a message is shown in the flowchart of FIG. 3. When utilizing the method of FIG. 3, blocks received without error are decrypted immediately, and those received in error are decrypted upon receipt of a retransmission of the data received without error using keystream generated from information received with the originally transmitted message. At step 301, a message 100 is received having an MI 101 and a plurality of encrypted blocks 103 through 111. At step 303, a keystream for the entire message 100 is generated from the MI 101, as described above, and stored temporarily or permanently, as desired. At step 305, a block counter, N, is initialized, i.e., N is set to 1. A step 307, block N is retrieved. At step 309, it is determined if block N was received in error. If block N was received in error, the process continues with step 311, where block N is marked as received in error, and the process continues with step 315. If at step 309 block N was received without error, the process continues with step 313, where block N is decrypted and the result is stored. The process continues with step 315, where the block counter N is incremented by 1, i.e., N=N+1. If at step 317 block N is not the last block of the message 100, the process continues with step 307. If at step 317, block N is the last block of the message 100, the process continues with step 319.

At step 319, if any block was received in error at step 309, the process continues with step 321, otherwise the process ends. At step 321, the communication unit requests retransmission (RE-TX) of any block(s) received in error. If retransmission (RE-IX) of such block(s) is received with one or more errors at step 323, the process continues with step 321. When retransmission (RE-IX) of any retry block(s) is received without error at step 323, the process continues with step 325, where a retry block is retrieved. A retry block is a block a data for which retransmission was requested, and the retransmission of the data block was received without error. At step 327, the retry block is decrypted using the keystream generated at step 303. The retry block includes the block number from the original transmission, which number is used to determine which part of the keystream is needed to decrypt the retry block. For example, if the retry block is block 9, and each block contains 200 bits of data, 1600 bits of data preceded block 9, the retry block. The keystream used to decrypt block 9 is 1600 bits into the keystream from the first bit of keystream used to decrypt the first bit of block 1. If at step 329 there are one or more retry blocks to decrypt, the process continues with step 325, otherwise the process continues with step 331. If at step 331 all blocks from the message 100 have been received correctly, the process ends, otherwise the process continues with step 321.

Because the keystream has already been generated, the steps of decrypting 313 and 327 are merely combining steps, i.e., XORing of the received cipher text with the generated/stored keystream to yield the plain (unencrypted) text that was originally encrypted by the transmitting device. The received cipher text need not be input to the KG for decryption, as the XORing process may be provided by a microprocessor, digital signal processor, or other means used to implement the flowcharts of FIG. 2 through FIG. 6. By avoiding the use of the KG at this stage, a significant amount of time can be saved because KGs run at much slower speeds (typically 6 to 50 kHz) than microprocessors, which over run at speeds over 1 MHz.

Figure 4:
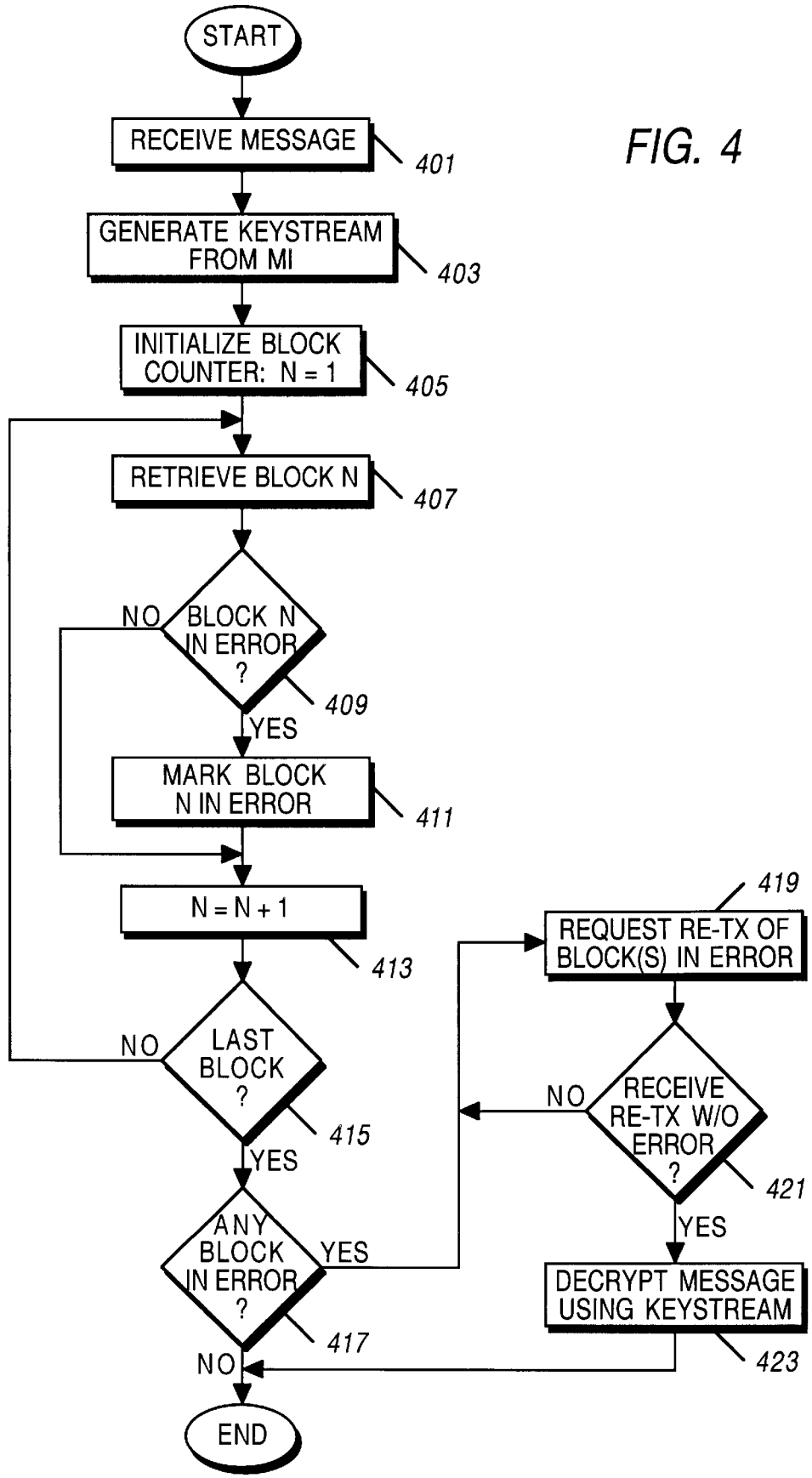

A flowchart showing a particular method of later decrypting messages by saving a keystream generated from the original transmission of a message is shown in the flowchart of FIG. 4. When utilizing the method of FIG. 4, the entire message is decrypted upon receipt of a retransmission of the data received without error using keystream generated from information received with the originally transmitted message. At step 401, a message 100 is received having an MI 101 and a plurality of encrypted blocks 103 through 111. At step 403, a keystream for the entire message 100 is generated from the MI 101 as described above and stored temporarily or permanently, as desired. At step 405, a block counter, N, is initialized, i.e., N is set to 1. A step 407, block N is retrieved. At step 409, it is determined if block N was received in error. If block N was received in error, the process continues with step 411, where block N is marked as received in error, and the process continues with step 413. If at step 409 block N was received without error, the process continues with step 413, where the block counter N is incremented by 1, i.e., N=N+1. If at step 415 block N is not the last block of the message 100, the process continues with step 407. If at step 415, block N is the last block of the message 100, the process continues with step 417.

At step 417, if any block was received in error at step 409, the process continues with step 419, otherwise the process ends. At step 419, the communication unit requests retransmission (RE-TX) of any block(s) received in error. If retransmission (RE-TX) of such block(s) is received with one or more errors at step 421, the process continues with step 419. Once retransmission (RE-TX) of all such block(s) are received without error at step 421, the process continues with step 423, where the entire message 100 is decrypted using the keystream generated at step 403. Because the keystream has already been generated, the step of decrypting 423 is merely a combining step, i.e., XORing of the received cipher text with the generated/stored keystream to yield the plain (unencrypted) text that was originally encrypted by the transmitting device.

Thus, the keystream is saved and used to decrypt part or all of a data message when parts of the message are received after a retry without having to regenerate or retransmit the keystream, nor waiting until the entire message is received without error to generate the keystream and decrypt the entire message. Similarly, decryption for selective retries is possible without having to redecrypt the entire message or decrypt all prior blocks of the message.

Another alternative method comprises the steps of receiving a message comprising a message indicator and a plurality of encrypted blocks. An encryption state is stored every Kth block of the plurality of encrypted blocks, where K is a positive integer. When at least one block of the plurality of encrypted blocks is received with error, transmitting a second message requesting a retransmission of the at least one block. Upon receiving the retransmission of the at least one block without error, generating a keystream from the stored encryption state and decrypting the at least one block using the keystream.

Figure 5:
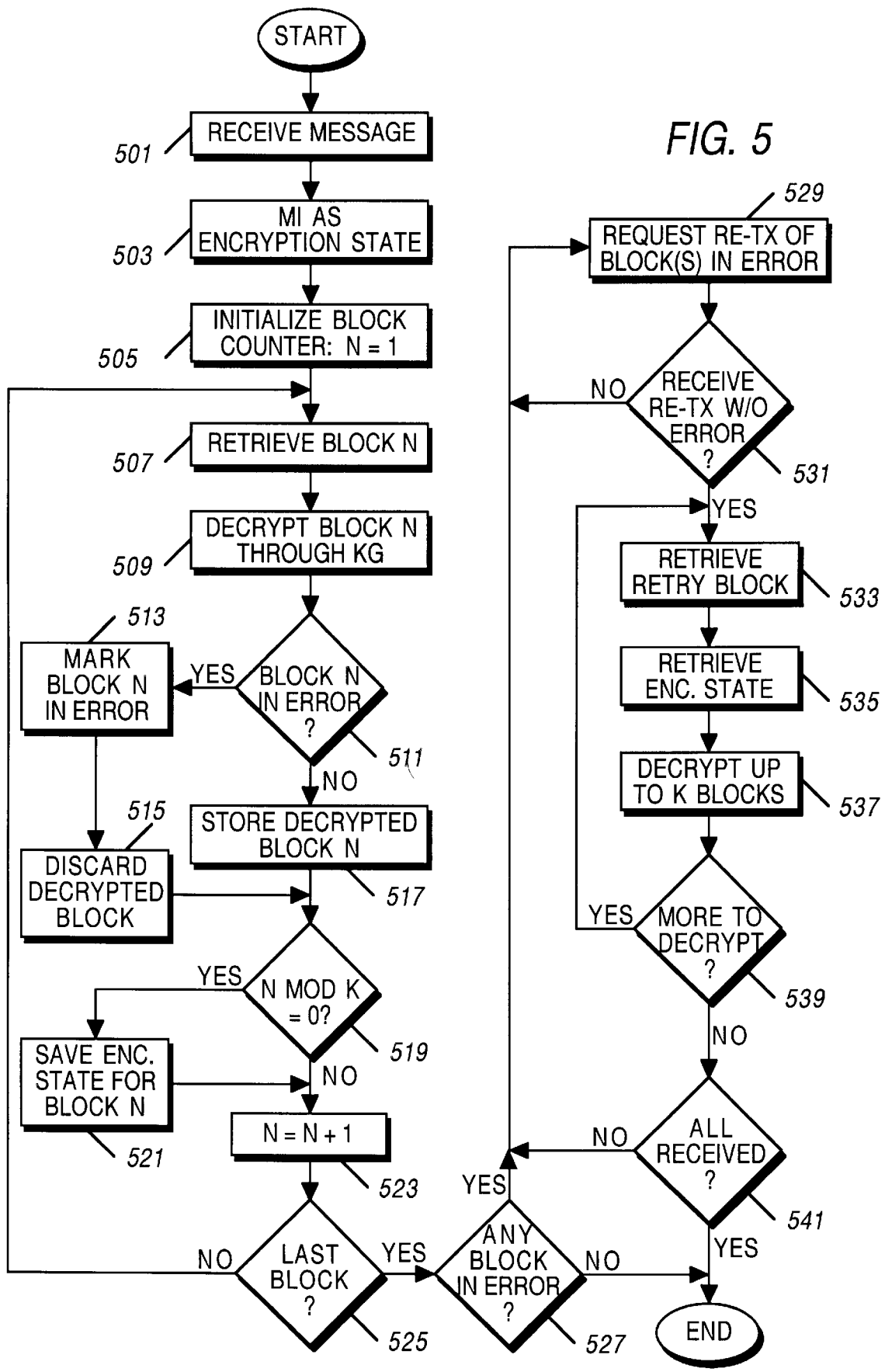
FIG. 5 is a flowchart showing a method of later decrypting messages by periodically saving the encryption state in accordance with the invention.

A flowchart showing an alternative method of later decrypting messages by periodically saving the encryption state is shown in the flowchart of FIG. 5. The method shown in this flowchart provides a trade-off between storage space and decryption time. This method saves the encryption state every K blocks, requiring two buffers: one buffer of N blocks to hold the received blocks and a second buffer of N divided by K encryption states. The method saves the encryption state periodically. The stored encryption state is used to reinitialize the KG for the portion of the message containing the retransmitted block. The parameter K provides the trade-off between decryption time and storage space. The larger K is, the longer the decryption time may be, but the less storage space is required. When utilizing the method of FIG. 5, blocks received without error are decrypted immediately, and those received in error are decrypted upon receipt of a retransmission of the data received without error. Alternatively, all blocks may be saved and decrypted at one time after all retry blocks are received correctly, e.g., when messages are short.

At step 501, a message 100 is received having an MI 101 and a plurality of encrypted blocks 103 through 111. At step 503, the MI 101 is set as the encryption state for the KG. Generally speaking, an encryption state is the internal point of the KG in its generation of a pseudo-random sequence, known as a keystream. The encryption state includes all necessary information to put two different KGs at the same place in a stream of data such that the decrypting KG can properly decrypt what the encrypting KG has encrypted. The encryption state for the OFB mode of operation is the KG state, which is comprised of the number of the last bits in the keystream of the previously decrypted block that are required to properly initialize the KG for decrypting the subsequent block. In the preferred embodiment, 64 bits are used. The encryption state for the CA mode of operation is the LFSR state, which is the data in the LFSR that is required to properly initialize the LFSR for decrypting the subsequent block. In the preferred embodiment, the 64 bits in the LFSR are used as the encryption state.

At step 505, a block counter, N, is initialized, i.e., N is set to 1. A step 507, block N is retrieved. At step 509, block N is decrypted by feeding the data of block N into the KG, i.e., normal decryption. At step 511, it is determined if block N was received in error. If block N was received in error, the process continues with step 513, where block N is marked as received in error, and the decrypted block N is discarded at step 515. If at step 511 block N was received without error, the process continues with step 517, where the result of the decryption of block N is stored. If at step 519 N modulo K is 0, the process continues with step 521, where the encryption state after decrypting block N is saved. The KG state after decrypting block N is the initial state for decrypting block N+1. For the OFB mode of operation, the KG state is stored. For the CA mode of operation, the LFSR state is stored. If at step 519 N modulo K is not equal to zero, the process continues with step 523. At step 523, the block counter N is incremented by 1, i.e., N=N+1. If at step 525 block N is not the last block of the message 100, the process continues with step 507. If at step 525, block N is the last block of the message 100, the process continues with step 527.

At step 527, if any block was received in error at step 511, the process continues with step 529, otherwise the process ends. At step 529, the communication unit requests retransmission (RE-IX) of any block(s) received in error. If retransmission (RE-IX) of such block(s) is received with one or more errors at step 531, the process continues with step 529. When retransmission (RE-IX) of all retry block(s) is received without error at step 531, the process continues with step 533, where a retry block is retrieved. At step 535, the encryption state is retrieved from the most recently stored value before the block number of the retry block. In other words, if the KG state is stored after every Kth block, the number of the KG state that should be retrieved to decrypt block N is the KG state that was stored after the block number, as given by:

K*{integer part (N−1)/K}.

For example, if the retry block is block 30 and K=4, where blocks 28 and 32 were saved, then the encryption state to be retrieved to decrypt block 30 is from block 4*{integer part (30−1)/4}=or 4*7=28, i.e., the encryption state of block 28 is retrieved. At step 537, the encryption state retrieved at step 535 is input to the KG, and up to K blocks, beginning after the block of the retrieved state and ending with the retry block, are decrypted normally, i.e., by inputting the received cipher text into the KG. By saving every Kth block, the worst case number of blocks to be decrypted is K The actual number of blocks be decrypted is given by:

K, if N mod K is 0;

N mod K, otherwise.

If at step 539 there are one or more retry blocks to decrypt, the process continues with step 533, otherwise the process continues with step 541. If at step 541 all blocks from the message 100 have been received correctly, the process ends, otherwise the process continues with step 529. A table showing information related to a system where K=3 is shown below, where the retrieve state is the encryption state stored after decrypting the block N.

| N | N mod K | RETRIEVE STATE | BLOCKS TO DECRYPT |
|---|---|---|---|
| 1 | 1 | 0(MI) | 1 |
| 2 | 2 | 0(MI) | 2 |
| 3 | 0 | 0(MI) | 3 |
| 4 | 1 | 3 | 1 |
| 5 | 2 | 3 | 2 |
| 6 | 0 | 3 | 3 |
| 7 | 1 | 6 | 1 |
| 8 | 2 | 6 | 2 |
| 9 | 0 | 6 | 3 |

Yet another alternative method comprises the steps of receiving a message comprising a message indicator and a plurality of encrypted blocks, particularly when using an encryption device operated in CA mode. The message indicator is stored. When at least one block of the plurality of encrypted blocks is received with error, a second message is transmitted, the second message requesting a retransmission of the at least one block. Upon receiving the retransmission of the at least one block without error, an encryption state is calculated from the stored message indicator, a keystream is generated from the encryption state, and the at least one block is decrypted using the keystream.

Figure 6:
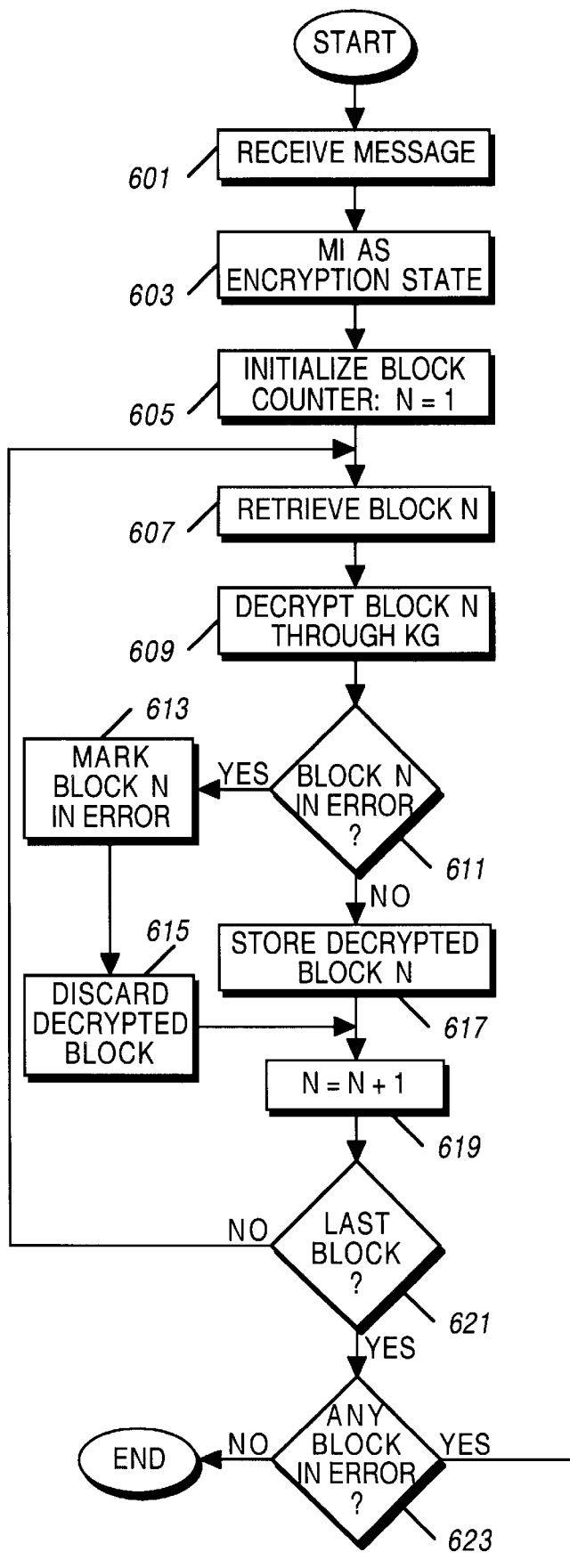
FIG. 6 is a flowchart showing a method of later decrypting messages by calculating the encryption state in accordance with the invention.
Figure 6:
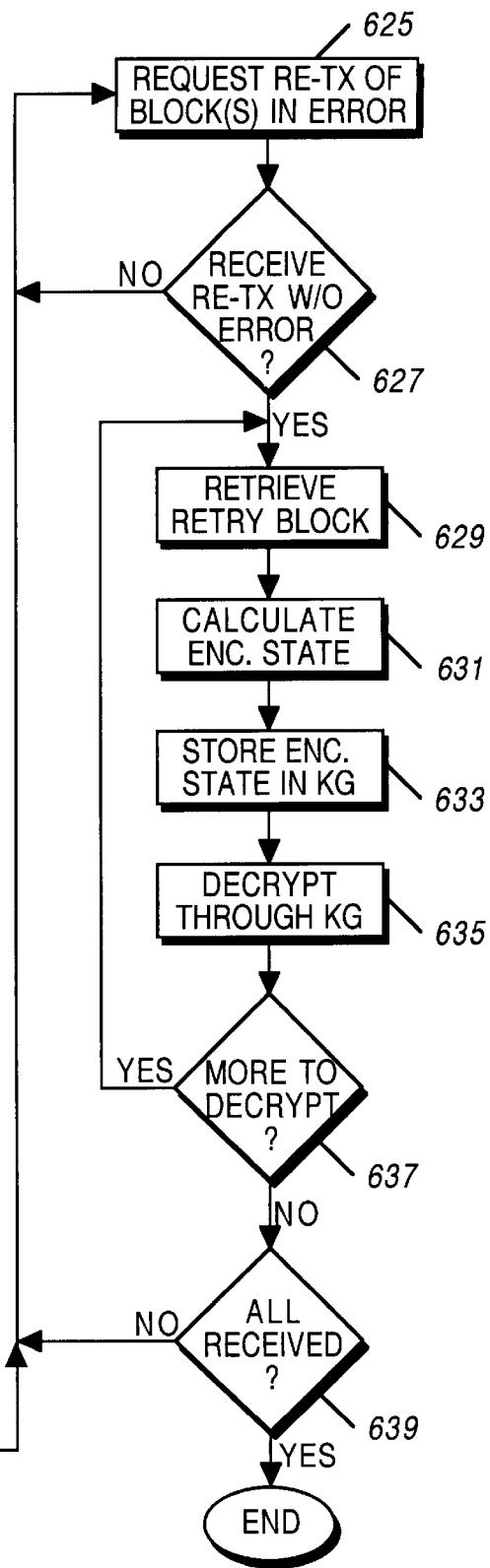

A flowchart showing an alternative method of later decrypting messages by calculating the encryption state is shown in the flowchart of FIG. 6. When utilizing the method of FIG. 6, blocks received without error are decrypted immediately, and those received in error are decrypted upon receipt of a retransmission of the data received without error. Alternatively, all blocks may be saved and decrypted at one time after all retry blocks are received correctly, e.g., when messages are short.

At step 601, a message 100 is received having an MI 101 and a plurality of encrypted blocks 103 through 111. At step 603, the MI 101 is set as the encryption state for the KG, as described with respect to step 503 of FIG. 5.

At step 605, a block counter, N, is initialized, i.e., N is set to 1. A step 607, block N is retrieved. At step 609, block N is decrypted by feeding the data of block N into the KG, i.e., normal decryption. At step 611, it is determined if block N was received in error. If block N was received in error, the process continues with step 613, where block N is marked as received in error, and the decrypted block N is discarded at step 615. Alternatively, the decryption function of step 609 may be combined into step 617, in which case step 609 is deleted (after step 607, the process continues with step 611). If at step 611 block N was received without error, the process continues with step 617, where the result of the decryption of block N is stored. At step 619, the block counter N is incremented by 1, i.e., N=N+1. If at step 621 block N is not the last block of the message 100, the process continues with step 607. If at step 621, block N is the last block of the message 100, the process continues with step 623.

At step 623, if any block was received in error at step 611, the process continues with step 625, otherwise the process ends. At step 625, the communication unit requests retransmission (RE-TX) of any block(s) received in error. If retransmission (RE-TX) of such block(s) is received with one or more errors at step 627, the process continues with step 625. When retransmission (RE-TX) of any retry block (s) is received without error at step 627, the process continues with step 629, where a retry block is retrieved. At step 631, the encryption state is calculated. For the CA mode of operation, the encryption state is the LFSR state, which is calculated by using the MI, the generator polynomial of the LFSR, and the block number.

The LFSR state used to decrypt block N is the initial state stored when decrypting block N−1. The number of bits preceding block N is needed to determine the LFSR state. If each block has the same number of bits, B, then N*B (N multiplied by B) is the total number of bits received before block N and also reflects the number of iterations the generator polynomial of the LFSR executed between the MI and block N. The LFSR state is the remainder from the equation:

$$x^{N*B} \div \text{generator polynomial.}$$

If, for example, the generator polynomial for a 64-bit LFSR is:

$$x^{62}+x^{46}+x^{38}+x^{27}+x^{15}+x^{0}$$

then the equation is:

$$x^{N*B} \div (X^{62}+x^{46}+x^{38}+x^{27}+x^{15}+x^{0}).$$

20 A sample of a remainder of the polynomial division is:

$$x^{63}+x^{59}+x^{51}+x^{46}+x^{40}+x^{35}+x^{31}+x^{26}+x^{19}+x^{14}+x^{8}+x^{0},$$

which would be the LFSR state for block N.

At step 633, the encryption state is stored in the KG. At step 635, the retry block is decrypted normally, i.e., by inputting the received cipher text into the KG. If at step 637 there are one or more retry blocks to decrypt, the process continues with step 629, otherwise the process continues with step 639. If at step 639 all blocks from the message 100 have been received correctly, the process ends, otherwise the process continues with step 625.

In prior encryption systems, decryption is performed by applying an encrypted data stream to a KG, which generates a keystream, as appropriate for the mode of encryption operation, and immediately decrypts the encrypted message by combining (typically XORing for digital information) the keystream with the encrypted message to yield plain (unencrypted) text. A typical KG decrypts a message in a bit-by-bit (or symbol-by-symbol) manner, i.e., one bit (symbol) of encrypted data into the KG yields one bit (symbol) of keystream that is combined with the input bit (symbol) to yield one bit (symbol) of decrypted data output by the KG. The combining step can be simply and quickly performed in a microprocessor, running at, for example, 1 MHz. Generation of the keystream, however, is limited by the frequency at which the KG may be operated, typically 6 to 50 kHz. Hence, the actual time to both generate a keystream and decrypt the encrypted message is limited substantially by the maximum frequency at which the KG may be operated. The above method and its alternatives saves time over prior methods by storing and/or generating the appropriate information to minimize the time to both receive and decrypt and entire message when retransmission of data is required. Increasing the clock speed of the KG is possible solution for improving throughput. Nevertheless, such a solution renders the implementation in some systems, where power consumption is a concern, practically impossible, because the amount of power required by a KG is proportional to the clock speed.

What is claimed is:

1. A method comprising the steps of:
   receiving a message comprising a message indicator and a plurality of encrypted blocks, wherein the plurality of encrypted blocks comprises L blocks, and wherein L is an integer greater than or equal to 2;
   when at least an Nth block of the plurality of encrypted blocks is received with error, transmitting a second message requesting a retransmission of at least the Nth block, where N is an integer having a value between 1 and L; upon receiving the retransmission of at least the Nth block without error, generating a keystream from the message indicator and decrypting the Nth block using the keystream wherein the keystream decrypts at least the Nth block but not all of the plurality of encrypted blocks.

2. The method of claim 1, further comprising the step of generating a keystream from the message indicator for use in decrypting the plurality of encrypted blocks before the step of transmitting.

3. The method of claim 2, further comprising the step of, when a first block of the plurality of encrypted blocks is received without error, decrypting the first block using the keystream.

4. The method of claim 1, wherein the step of decrypting comprises the step of decrypting only the Nth block using the keystream.

5. The method of claim 1, further comprising the step of storing an encryption state every Kth block of the plurality of encrypted blocks, where K is a positive integer.

6. The method of claim 1, further comprising the step of storing the message indicator.

7. The method of claim 6, wherein when receiving the retransmission of the at least one block without error, the step of generating includes generating the keystream from the stored encryption state and decrypting the at least one block using the keystream generated from the stored encryption state.

8. The method of claim 1, wherein the message indicator contains an initialization vector, further comprising the step of generating a keystream by executing an encryption algorithm operating in an output-feedback mode of operation N multiplied by B iterations for an N block message, where N and B are positive integers.

9. The method of claim 1, wherein the message indicator contains a linear feedback shift register vector, generating a keystream by executing an encryption algorithm operating in a counter-addressing mode of operation N multiplied by B iterations for an N block message, where N and B are positive integers.

10. A method comprising the steps of:
   receiving a message comprising a message indicator and a plurality of encrypted blocks;
   generating a keystream from the message indicator for use in decrypting the plurality of encrypted blocks;
   when at least one block of the plurality of encrypted blocks is received with error, transmitting a second message requesting a retransmission of the at least one block;
   upon receiving the retransmission of the at least one block without error, decrypting the at least one block using the keystream, wherein the plurality of encrypted blocks was encrypted sequentially, and the plurality of encrypted blocks is decrypted in an order other than sequentially.

11. The method of claim 10, further comprising the step of, when a first block of the plurality of encrypted blocks is received without error, decrypting the first block using the keystream.

12. The method of claim 10, wherein the step of decrypting comprises the step of decrypting only the Nth block using the keystream.

13. The method of claim 10, wherein the message indicator contains an initialization vector, further comprising the step of generating a keystream by executing an encryption algorithm operating in an output-feedback mode of operation N multiplied by B iterations for an N block message, where N and B are positive integers.

14. The method of claim 10, wherein the message indicator contains a linear feedback shift register vector, generating a keystream by executing an encryption algorithm operating in a counter-addressing mode of operation N multiplied by B iterations for an N block message, where N and B are positive integers.

15. A method comprising the steps of:

receiving a message comprising a message indicator and a plurality of encrypted blocks;

storing an encryption state every Kth block of the plurality of encrypted blocks, where K is a positive integer;

when at least one block of the plurality of encrypted blocks is received with error, transmitting a second message requesting a retransmission of the at least one block;

upon receiving the retransmission of the at least one block without error,
  a) generating a keystream from the stored encryption state without generating
     a keystream for all of the plurality of encrypted blocks;
  b) decrypting the at least one block using the keystream.

16. The method of claim 15, further comprising the step of, when a first block of the plurality of encrypted blocks is received without error, decrypting the first block using the keystream.

17. The method of claim 15, further comprising the step of, when all of the plurality of encrypted blocks are received without error, decrypting the plurality of encrypted blocks using the keystream.

18. The method of claim 15, wherein the message indicator contains an initialization vector, further comprising the step of generating a keystream by executing an encryption algorithm operating in an output-feedback mode of operation N multiplied by B iterations for an N block message, where N and B are positive integers.

19. The method of claim 15, wherein the message indicator contains a linear feedback shift register vector, generating a keystream by executing an encryption algorithm operating in a counter-addressing mode of operation N multiplied by B iterations for an N block message, where N and B are positive integers.

20. A method comprising the steps of:

receiving a message comprising a message indicator and a plurality of encrypted blocks;

storing the message indicator; when at least one block of the plurality of encrypted blocks is received with error, transmitting a second message requesting a retransmission of the at least one block;

upon receiving the retransmission of the at least one block without error,
  a) calculating an encryption state from the stored message indicator;
  b) generating a keystream from the encryption state;
  c) decrypting the at least one block using the keystream, wherein the plurality of encrypted blocks was encrypted sequentially, and the plurality of encrypted blocks is decrypted in an order other than sequentially.

21. The method of claim 20, further comprising the step of, when a first block of the plurality of encrypted blocks is received without error, decrypting the first block using the keystream.

22. The method of claim 20, further comprising the step of, when all of the plurality of encrypted blocks are received without error, decrypting the plurality of encrypted blocks using the keystream.

23. The method of claim 20, wherein the step of calculating comprises the steps of:

determining a block number of the at least one block, yielding a positive integer N;

determining how many bits are in each block of the plurality of encrypted blocks, yielding a positive integer B;

multiplying N by B, yielding a number of iterations;

determining a generator polynomial for a linear feedback shift register;

combining the number of iterations with the generator polynomial, yielding the encryption state for the beginning of the Nth block.

* * * * *